(12) United States Patent
Crabb et al.

(10) Patent No.: US 11,289,887 B2
(45) Date of Patent: Mar. 29, 2022

(54) EXPANDED TWO-GANG ELECTRICAL BOX

(71) Applicants: Jessy Crabb, Holly Hill, FL (US); Stewart Denton, Holly Hill, FL (US)

(72) Inventors: Jessy Crabb, Holly Hill, FL (US); Stewart Denton, Holly Hill, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 0 days.

(21) Appl. No.: 17/140,865

(22) Filed: Jan. 4, 2021

(65) Prior Publication Data

US 2021/0234348 A1    Jul. 29, 2021

Related U.S. Application Data

(63) Continuation-in-part of application No. 16/454,145, filed on Jun. 27, 2019, now Pat. No. 10,886,716.

(60) Provisional application No. 62/690,480, filed on Jun. 27, 2018.

(51) Int. Cl.
*G02B 6/00* (2006.01)
*H02G 3/08* (2006.01)
*H02G 3/12* (2006.01)

(52) U.S. Cl.
CPC ............. *H02G 3/083* (2013.01); *H02G 3/121* (2013.01)

(58) Field of Classification Search
CPC ........ H02G 3/083; H02G 3/121; H02G 3/081; H02G 3/126
See application file for complete search history.

(56) References Cited

U.S. PATENT DOCUMENTS

| | | | |
|---|---|---|---|
| 7,259,327 B1 * | 8/2007 | Herth | H02G 3/126 174/50 |
| 9,966,746 B1 * | 5/2018 | Ediger | H02G 3/126 |
| 2006/0061978 A1 * | 3/2006 | Palermo | H02G 3/126 361/807 |
| 2009/0084571 A1 * | 4/2009 | Phillips | H02G 3/126 174/59 |
| 2013/0180774 A1 * | 7/2013 | Gagne | H02G 3/12 174/480 |
| 2017/0179657 A1 * | 6/2017 | Wolfson | H01R 13/665 |
| 2021/0234348 A1 * | 7/2021 | Crabb | H02G 3/083 |

* cited by examiner

*Primary Examiner* — Ellen E Kim
(74) *Attorney, Agent, or Firm* — J. Wiley Horton

(57) ABSTRACT

A wall-mounted enclosure having a standard forward-facing opening but also having an expanded enclosure behind the opening. The opening allows the use of conventional prior art components (such as cover plates). The expanded enclosure allows a more generous bend radius for the creation of a service loop in a fiber optic cable or similar component.

20 Claims, 13 Drawing Sheets

EXPANDED TWO-GANG ELECTRICAL BOX

CROSS-REFERENCES TO RELATED APPLICATIONS

This non-provisional patent application is a continuation-in-part of U.S. patent application Ser. No. 16/454,145. The parent application names the same inventors.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of wiring. More specifically, the invention comprises an expanded electrical box that allows a larger cable storage volume behind a standard two-gang opening.

2. Description of the Related Art

Fiber optic cables are now commonly used in residential and commercial buildings. These cables carry signals that were previously carried by electrical cables such as RG-6 coaxial cable. As an example, a fiber optic cable is now often directly routed to a wall-mounted television. The electrical and fiber optical cables routed to wall-mounted devices are typically stored in a wall-mounted electrical junction box, and this presents a problem.

A flat screen television is often mounted directly over an electrical box that houses power supply conductors. A separate electrical box is often provided for the audio and video signal cables (whether electrical or optical). The mounted television prevents access to these wall-mounted boxes. A "service loop" (a coil of cable) is provided in each cable so that the television can be pulled away from the wall while the cables are still connected. The term "service loop" means an extra length of cable that allows the television (or similar component) to be pulled away from the electrical box without pulling any connectors free of the television. The word "loop" is used because this excess length is generally formed into a loop as the television is moved back against the wall. The loop is most often pushed into the electrical box so it does not hang free.

The presence of the service loop(s) allows the various cable to be connected to the television—or disconnected from the television—while the television is positioned away from the wall. Some television mounts even support the television while it is moved into this distal position to facilitate service.

There are many prior art electrical boxes that are used to supply cables needing a service loop. FIG. 1 provides a common example. The reader should bear in mind that such boxes come in many different configurations. The opening size is somewhat standardized, however, and this fact is important. Two-gang box 10 is a standard enclosure intended to house two electrical outlets or two switches (hence the use of the name "two-gang").

The box has four side walls: mounting wall 12, free side wall 14, bottom wall 16, and top wall 18. Mounting wall 18 is configured to rest against the side of a wall stud. Nails 38, 42 are mounted in nail mounts 36, 40. Once the mounting wall is placed against the side of a wall stud, nails 38, 40 are driven laterally into the stud to securely mount the box.

The two-gang box shown is intended for new construction. It is attached to a wall stud before the dry wall is hung. Drywall standoffs 44,46 provide the correct spacing so that forward face 33 of the box will be flush with the drywall when the drywall is installed. The rear extreme of each drywall standoff slips over the forward face of a wall stud to establish the proper position. Essentially, the drywall standoffs 44,46 are as deep as the thickness of the drywall to be used. Different standoff distances are available for different drywall thicknesses.

Prior art electrical boxes are available in left-handed and right-handed versions (with the nails oriented to drive into a stud on the left of the box or on the right of the box). They are also made in "construction" versions and "old work" versions. FIGS. 1-4 illustrate a construction version, which is intended for new construction before drywall is installed. An "old work" version usually includes movable tabs configured to engage the drywall itself rather than a stud. This type may be installed after the drywall is mounted.

Rear wall 31 closes off the rear of two-gang box 10. The forward portion of the box is open. Four bosses 20,22,24,26 provide material in which four mounting holes 28,30,32,34 are made. The four mounting holes are configured to receive screws that attach prior art switches or outlets. A face plate then screws to threaded holes provided on the switch or outlet. Some face plates are configured to cover portions of electrical outlets, some faceplates are configured to cover portions of electrical switches, and some face plates are configured to mount various data connectors.

The example shown in FIG. 1 includes multiple openings 54 with accompanying cable clamps 48,50,52, As those skilled in the art will know, an electrician pushes a cable through one of these openings and into the box. A cable clamp is pushed out of the way as the cable is introduced. The cable clamp resists the tendency of the cable to slip back out of the box (thereby creating a sort of strain relief).

FIG. 2 shows two gang box 10 mounted to stud 56. The reader will note that nails 38,42 have been driven laterally into the stud. The reader will also observe how drywall standoffs 44,46 engage the front face of the stud and provide the proper spacing for the drywall to be flush with forward face 33 of two-gang box 10. In this state the electrical lines and data cables would typically be pulled and inserted into the box for later completion.

FIG. 3 shows the same assembly after the installation of drywall 58. Drywall opening 60 is sized to admit forward face 33 of two gang box 10. Such openings are often made with rotary cutters—allowing the creation of a rectangular opening without fracturing the surrounding dry wall. The fit between the walls of the two-gang box and drywall opening 60 can be fairly crude. A face plate will often be added. The face plate is significantly larger that drywall opening 60 and its presence "dresses" the final assembly. The reader should note that electrical or data cables would typically be present in the box by the time the drywall is added. These cables are not shown in FIG. 3 for purposes of visual clarity.

The cables are shown in FIG. 4. In this view, fiber optic cable 62 has been pulled through cable opening 54 and secured by cable clamp 48. Likewise fiber optic cable 64 has been pulled through cable opening 66 and secured by the cable clamp associated with that opening.

FIG. 5 shows the two fiber optic cables 62, 64 pulled through the electrical box to a length that is suitable for the installation (including a service loop). Fiber optic cable 62 has been coiled into loop 68 and secured with a pair of binders 72. Likewise, fiber optic cable 64 has been formed into loop 70 and secured with binders 72. A connector 74 has been added to the end of each fiber optic cable. Each connector may provide a termination for multiple optical strands.

FIG. 8 shows an exemplary prior art fiber optic cable 62. This version includes 6 separate optical strands 98. These six strands are contained within a jacket 96, along with strength filaments 102 (non-optical fibers configured to absorb tensile loads). At the center of each optical strand is a core 106 surrounded by a cladding layer. The core itself is glass. The cladding layer is a material that bonds well to the glass and provides total internal reflectance. Protective layer 104 is added over the cladding. The protective layer is typically an acrylate polymer or polyimide.

Most optical data cables run over short to moderate distances are multi-mode optical fiber. These cables carry multiple signals that are separated by wavelength in order to minimize interference. Most such cables have a specified minimum bend radius that can be used during installation and a minimum bend radius that can be used during operation (often specified as a multiple of the overall diameter "d"). The minimum radius for installation is the minimum bend the cable can undergo without causing plastic deformation or some other form of damage. The operational minimum bend radius is larger. This larger value represents the minimum bend that can be allowed without data corruption.

Optical cables depend upon complete (or very nearly complete) internal reflectance. A tight bend compromises internal reflectance. Further, a tight bend starts to create interference between the different wavelengths that are carried on a multi-mode cable.

Returning to FIG. 5, the reader will readily appreciate a problem with the prior art approach to the installation of fiber optic cables. Loops 68 and 70 are created with an outside diameter of "D2." This diameter represents a suitable minimum bend radius for the cables. A typical minimum operational bend radius for a fiber optic cable is 2.5 inches (63 mm). This requirement produces a minimum loop diameter of 5.0 inches (127 mm). However, a two-gang box typically has internal dimensions of 4.0 inches by 4.0 inches (102 mm by 102 mm). These dimensions are not standardized. The spacing for mounting holes 28, 30, 32, 34 is standardized—since these holes must align with the mounting features on the outlets or switches—but the dimensions of the box itself are not standardized. The width appears to vary between about 3.90 and 4.20 inches (99 mm to 107 mm). The height varies between about 3.90 and 4.10 inches (99 mm to 104 mm).

The existing two-gang boxes do not provide enough room for a suitable service loop diameter when installing fiber optic cables. A tighter radius runs the risk of compromising the transmission of data through the cables. However, in order to place a service loop in a protected position within an electrical box, loops 68 and 70 must be placed within the internal dimensions of prior art two-gang box 10.

In actuality, the installers tighten the loops significantly so they can be stuffed into the prior art box 10. The optical cables will generally still function. However, the data loss rate will be higher and the transmission speed will be reduced. Alternatively, the user may observe drop-out buffering in which a signal periodically syncs and then un-syncs.

Neither condition is desirable. A preferable solution would allow the storage of a service loop having a larger diameter. The present invention provides just such a solution.

BRIEF SUMMARY OF THE PRESENT INVENTION

The present invention provides a wall-mounted enclosure having a standard forward-facing opening but also having an expanded enclosure behind the opening. The opening allows the use of conventional prior art components (such as cover plates). The expanded enclosure allows a more generous bend radius for the creation of a service loop in a fiber optic cable or similar component.

Figure 1:
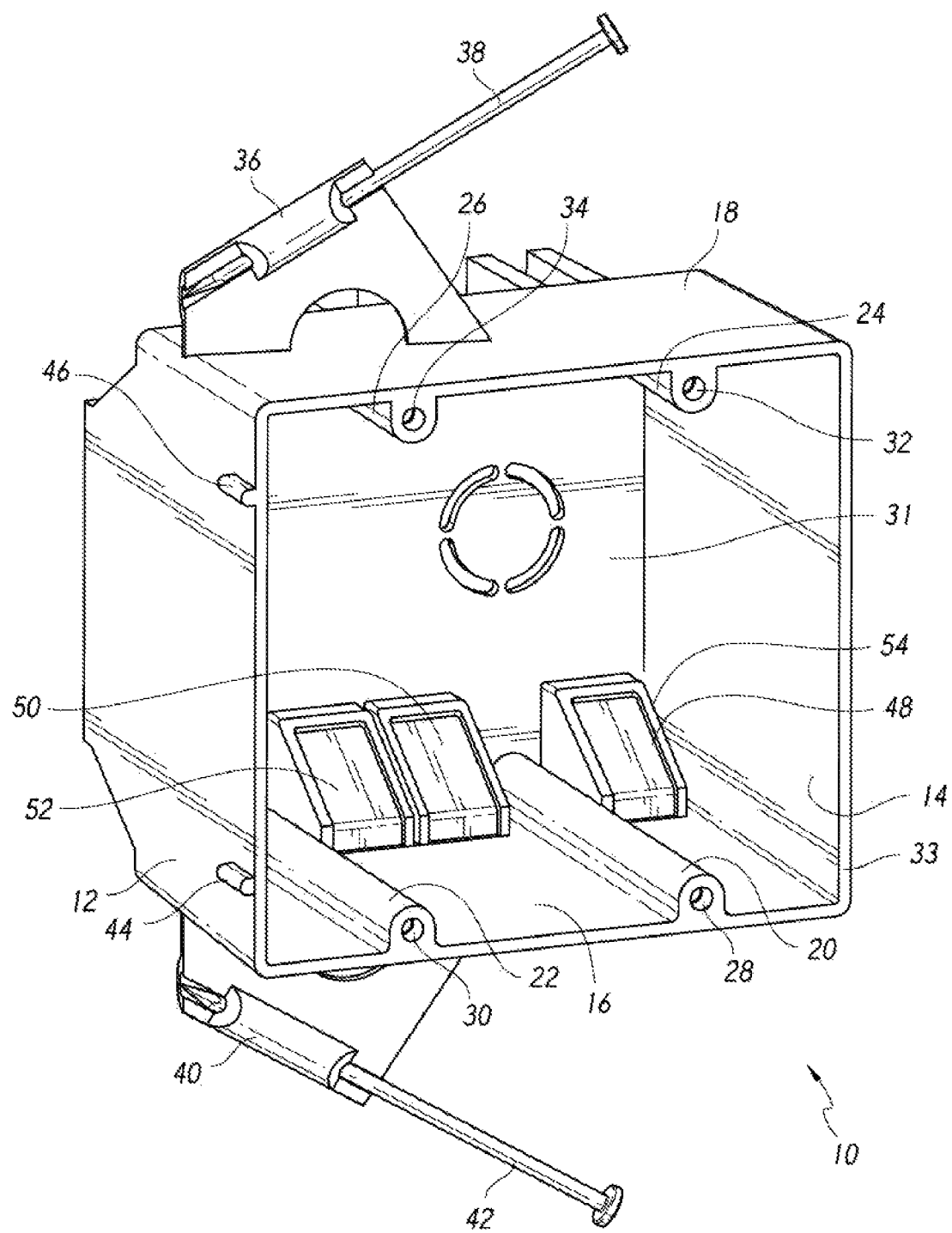
FIG. 1 is a perspective view, showing a prior art twin gang electrical box.
Figure 2:
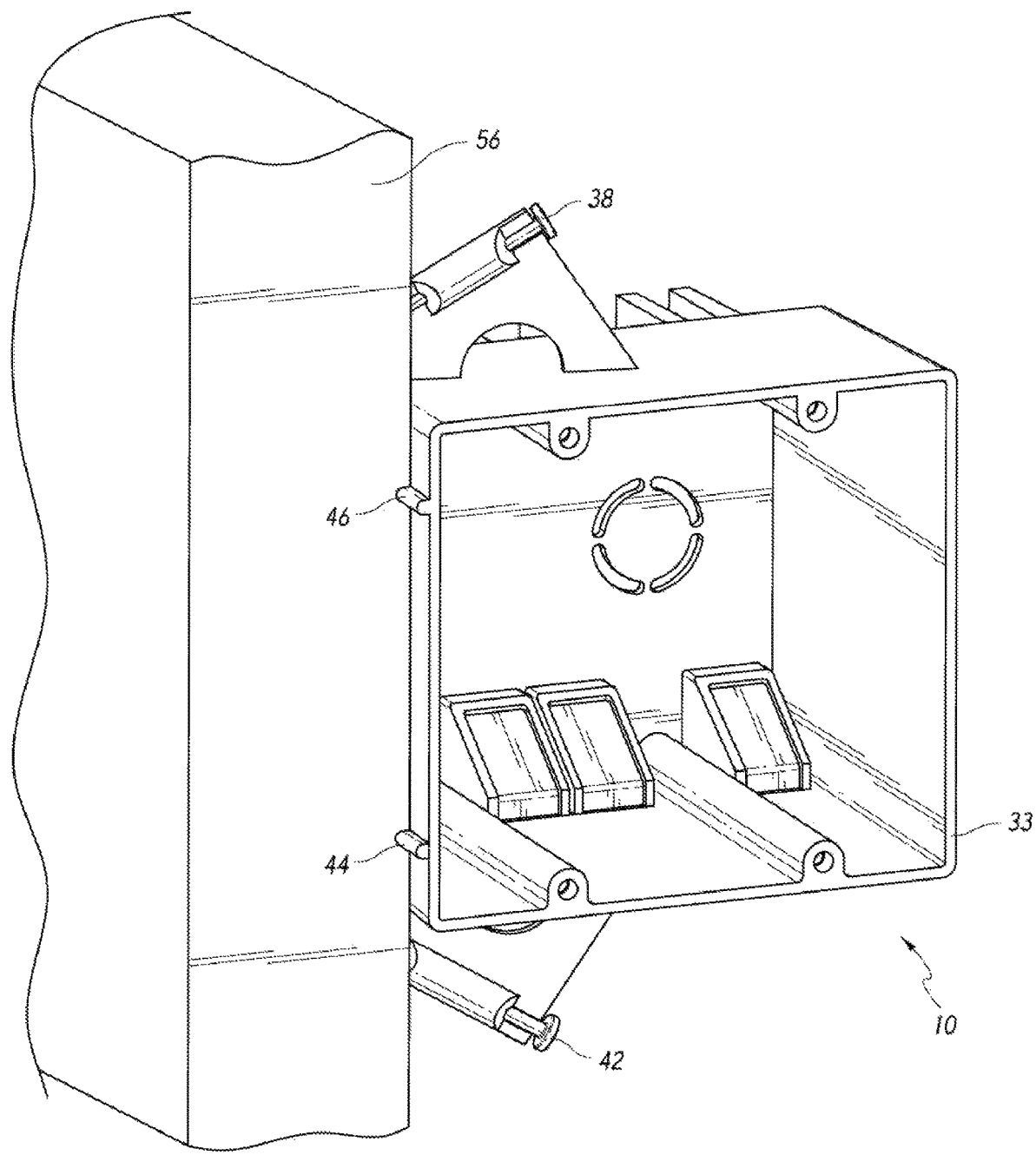
FIG. 2 is a perspective view, showing the electrical box of FIG. 1 installed on a wall stud.
Figure 3:
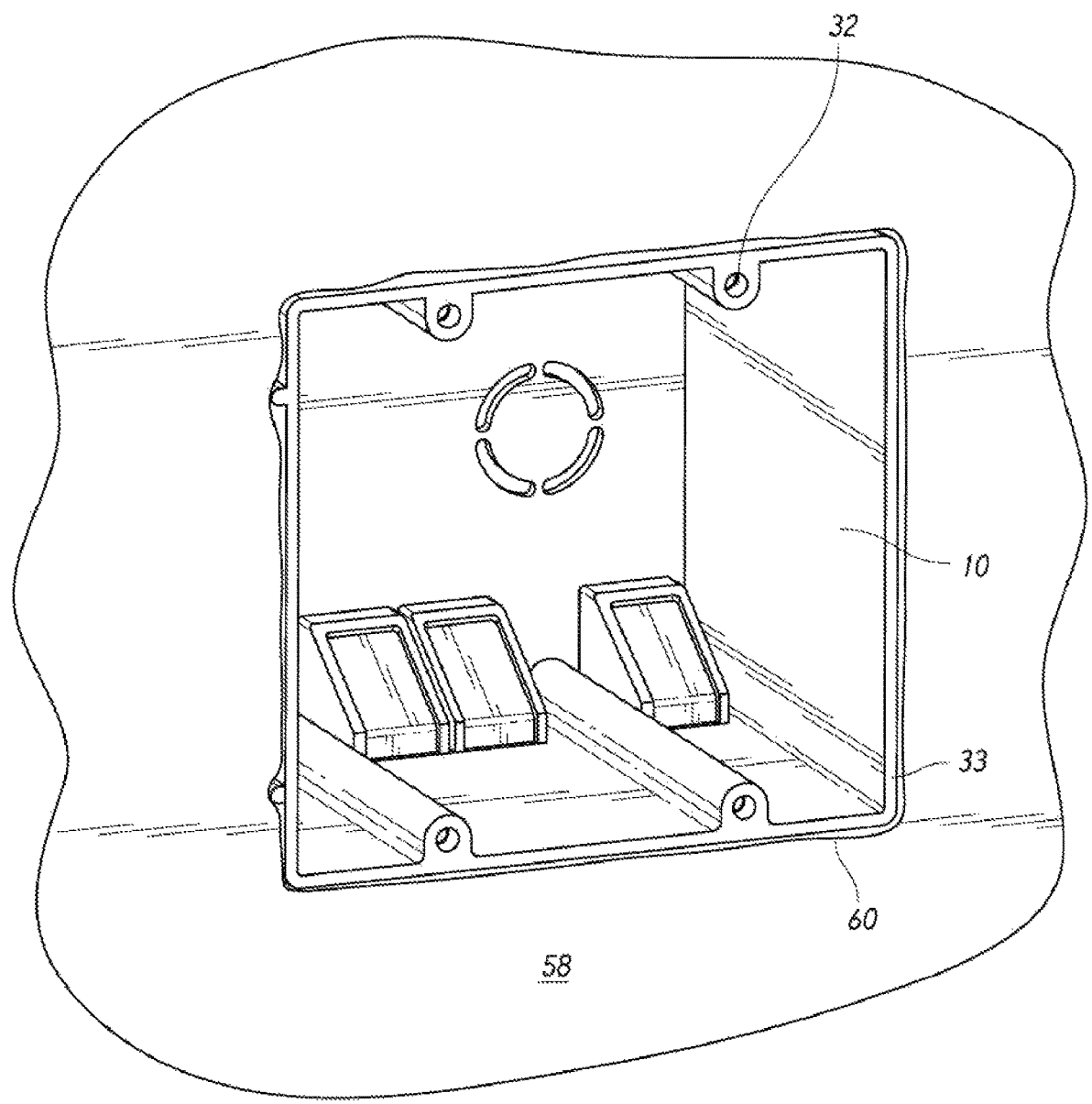
FIG. 3 is a perspective view, showing the configuration of FIG. 2 after the installation of drywall.
Figure 4:
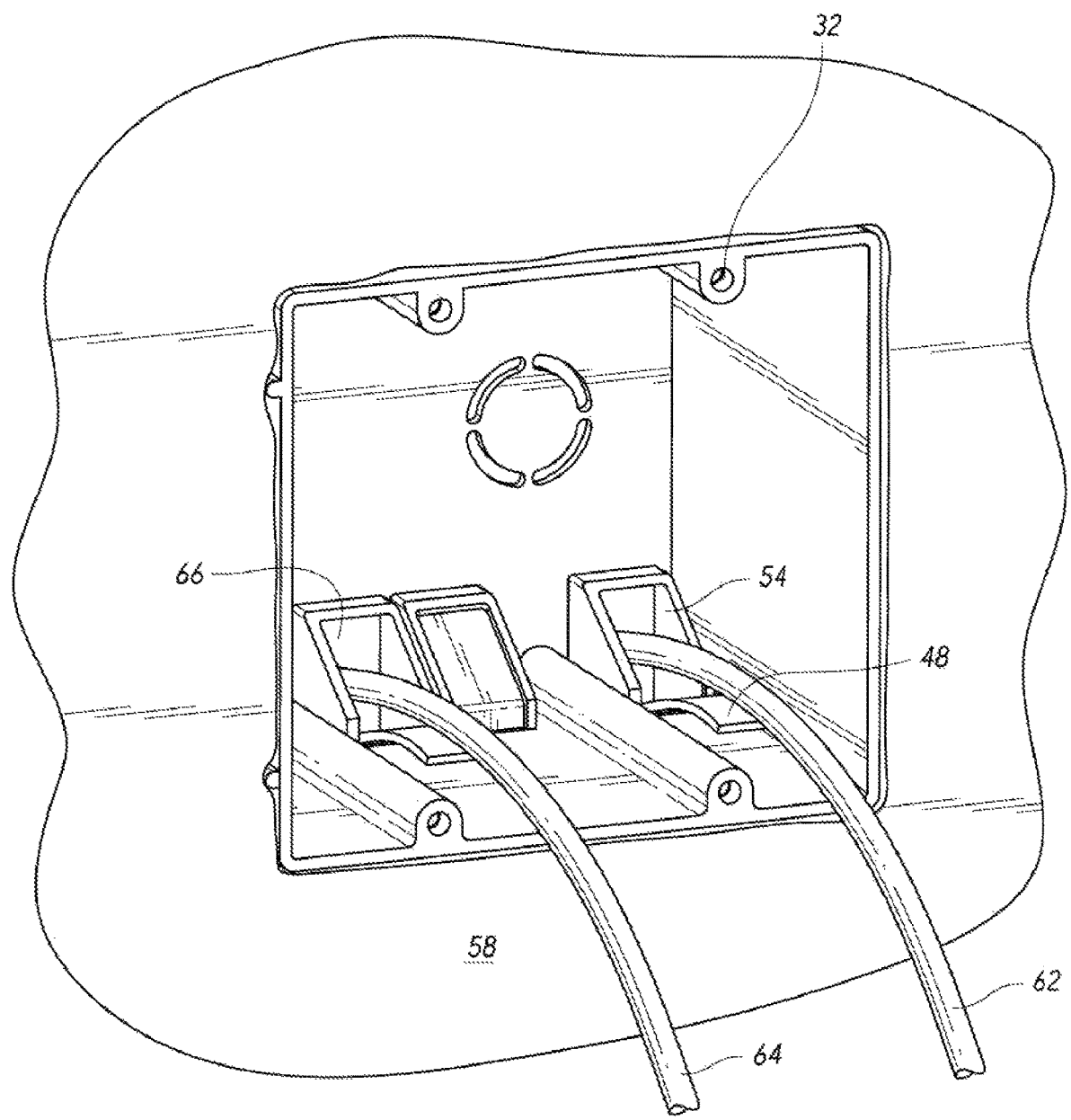
FIG. 4 is a perspective view, showing the configuration of FIG. 3 after the installation of two fiber optic cables.
Figure 5:
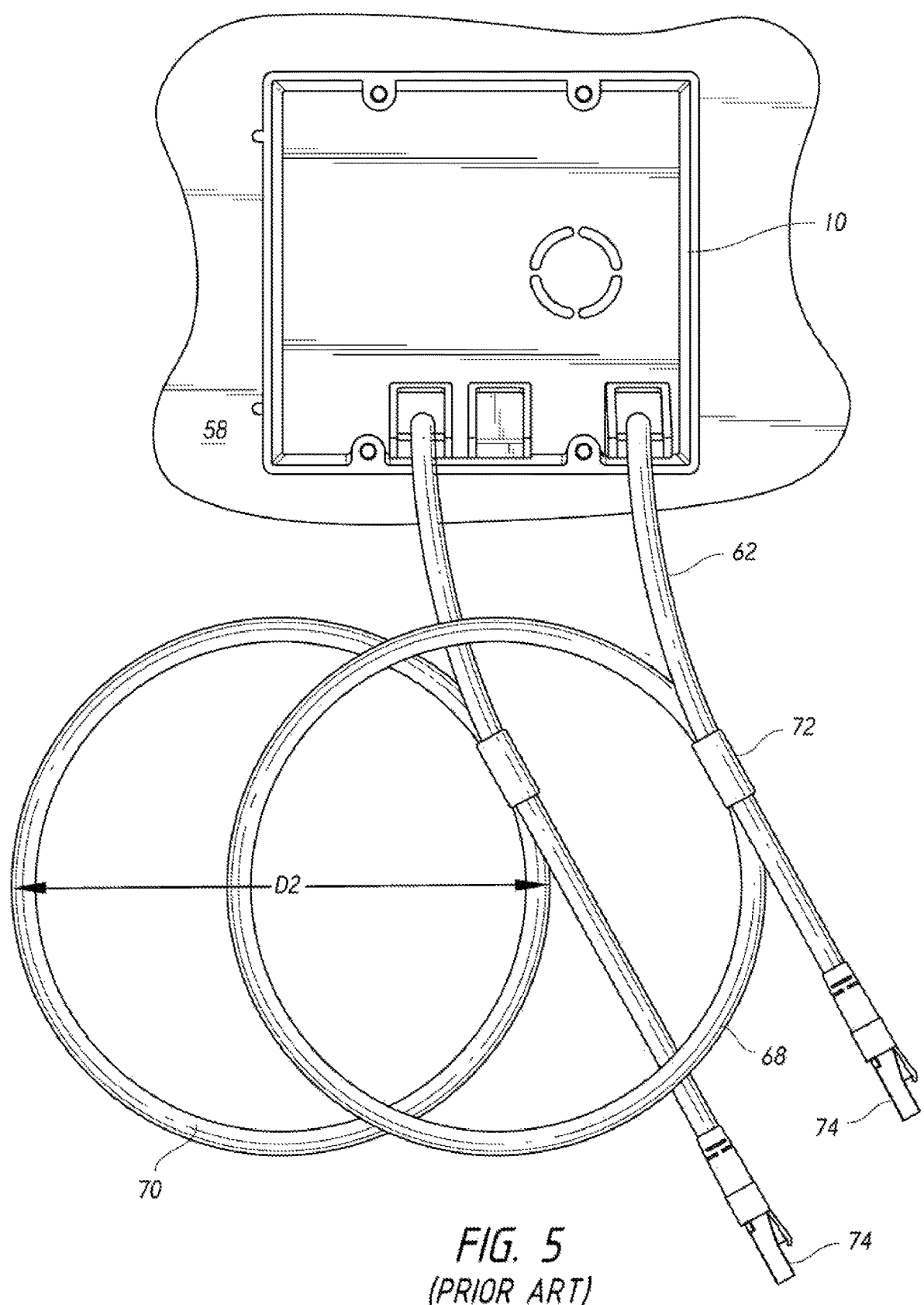
FIG. 5 is an elevation view, showing the configuration of FIG. 4 after each fiber optic cable is formed into a loop.

REFERENCE NUMERALS IN THE DRAWINGS 10 two-gang box
12 mounting wall
14 free side wall
16 bottom wall
18 top wall
20 boss
22 boss
24 boss
26 boss
28 mounting hole
30 mounting hole
31 rear wall
32 mounting hole
33 forward face
34 mounting hole
36 upper nail mount
38 nail
40 lower nail mount
42 nail 44 drywall standoff
46 drywall standoff
48 cable clamp
50 cable clamp
52 cable clamp
54 cable opening
56 stud
58 drywall
60 drywall opening
62 fiber optic cable
64 fiber optic cable
66 cable opening
68 loop
70 loop
72 binder
74 connector
75 forward face
76 expanded electrical box
78 two-gang opening
80 expanded enclosure
81 forward wall
82 coaming
84 mounting wall
86 free side wall
87 rear wall
88 bottom wall
90 top wall
92 cable opening
94 cable clamp
96 jacket
98 strand
102 strength filaments
104 protective layer
106 core and cladding layer
110 loop
112 loop
114 expanded electrical box
116 expanded enclosure
118 circular perimeter
120 cable entrance boss

DETAILED DESCRIPTION OF THE INVENTION

Figure 6:
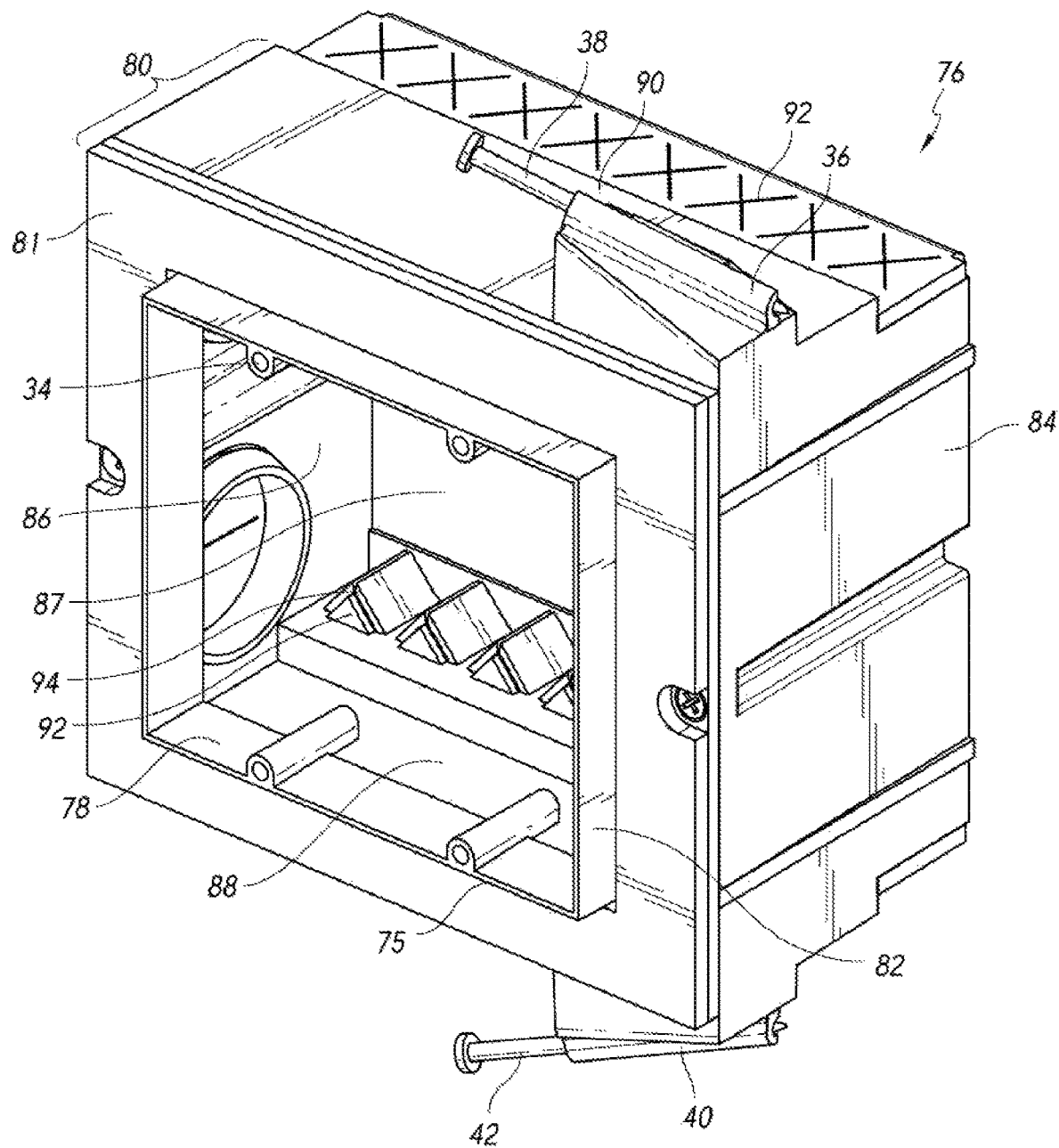
FIG. 6 is a perspective view, showing an embodiment of the present invention.

FIG. 6 depicts a preferred embodiment of the electrical box used to carry out the present invention. Expanded electrical box 76 includes many components. A significant feature is expanded enclosure 80, which is best understood with respect to two-gang opening 78.

Two-gang opening 78 is the semi-standard opening that will actually be exposed through the wall. This is the opening used to conventionally mount a pair of light switches or a pair of electrical outlets. Coaming 82 extends forward from forward wall 81—around the perimeter of the two-gang opening—in a direction that is perpendicular to forward wall 81. The coaming defines the perimeter of the two-gang opening. The forward-most portion of the coaming ends in forward face 75. Four mounting holes (such as 34) are provided in forward face 75. These four mounting holes are provided with the same standardized spacing as for the prior art (such as mounting holes 28, 30, 32, and 34 in FIG. 1).

In comparing FIG. 6 to the prior art electrical box of FIG. 1, the reader will note that forward face 75 and coaming 82 represents the common size of a prior art two-gang box. Expanded enclosure 80 is considerably enlarged and provides more interior room than a conventional two-gang box. Hence the enclosure provided behind forward wall 81 is referred to as expanded enclosure 80.

Mounting wall 84 is configured to mate to the side of a wall stud as for conventional outlet boxes. Bottom wall 88 and top wall 90 are connected to mounting wall 84. Free side wall 86 is connected to bottom wall 88 and top wall 90. Rear wall 87 closes the rear of expanded enclosure 80. Forward wall 81 closes the front side of expanded enclosure 80.

Two-gang opening 78 has a width between about 3.75 and 4.50 inches (95 mm to 114 mm). It has a height between about 3.75 inches and 4.25 inches (95 mm to 108 mm). Expanded enclosure 80 has a greater width and height. The width of expanded enclosure 80 is between about 5.25 inches and about 7.5 inches (133 mm to 191 mm). The expanded enclosure likewise has a height between about 5.25 inches and about 7.5 inches (133 mm to 191 mm).

Many other conventional features can be added to expanded electrical box 76. A plurality of openings 92 and associated cable clamps 94 can be provided on the bottom wall and the top wall. These can be provided on the side walls as well. Upper nail mount 36 mounts nail 38—positioned for driving into a stud abutting mounting wall 84. Lower nail 42 and nail mount 40 are likewise positioned to drive nail 42 into a wall stud. One or more knock out plugs can be provided. Mounting holes for the mounting of a partial or full cover plate or trim plate can also be provided.

Figure 7:
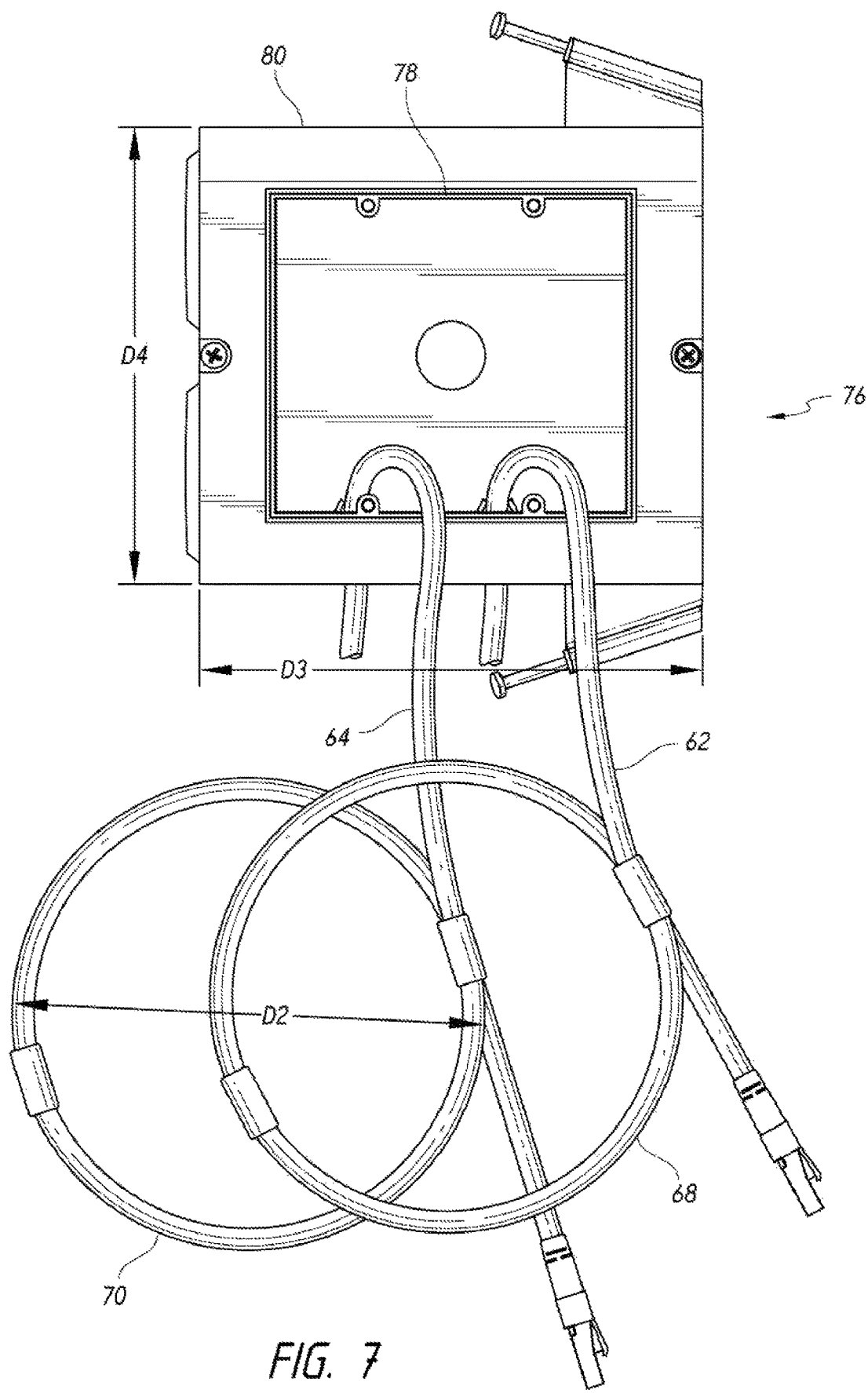
FIG. 7 is an elevation view, showing an embodiment of the present invention.
Figure 8:
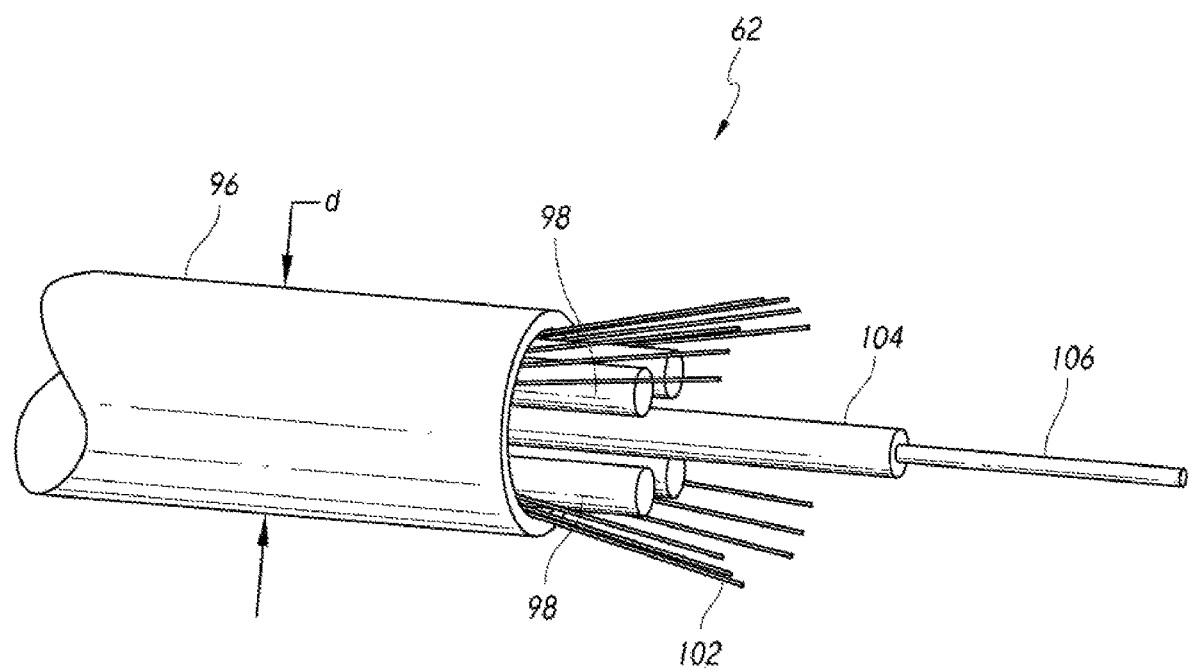
FIG. 8 is a perspective view, showing a prior art multi-stranded fiber optic cable.

FIG. 7 depicts the operational advantage of expanded electrical box 76. Fiber optic cables 62, 64 have been fed through openings into expanded enclosure 80 and then out two-gang opening 78. Loop 68 is formed in fiber optic cable 62 and loop 70 is formed in fiber optic cable 64. Both loops have an outer diameter D2. D3 is the overall width of expanded enclosure 80. D4 is the overall height of the expanded enclosure. In this version D3 and D4 are the same value. The interior width of expanded enclosure 80 is D3 minus the wall thickness of mounting wall 84 and fee side wall 86. The interior height of expanded enclosure 80 is D4 minus the wall thickness of bottom wall 88 and top wall 90.

A goal of the present invention is to make the interior height and width of expanded enclosure 80 large enough to accommodate loops 68,70 without significant deformation. In other words, the expanded enclosure is made large enough to house the loops without having to bend them into a tighter loop. For many multi-mode fiber optic cables the minimum loop diameter is about 5.0 inches. This is too large for a standard two-gang box. However, expanded enclosure 80 is large enough to house such a loop if its overall height and width are equal to or greater than 5.25 inches. The upper limit on these dimension is one of practicality. Material cost becomes too great at some point and structural rigidity may be lost. An upper limit of about 7.5 inches on the height and width of expanded enclosure 80 is preferable—for the embodiment depicted in FIG. 7.

Of course, in order to place loops 68, 70 into expanded enclosure 80 they may have to be bent into a smaller diameter to pass through two-gang opening 78. The reader will recall that a fiber optic cable may be bent into a relatively small bend during installation without causing damage to the cable. It is only during operation that such a tight bend causes data transmission problems (since the light may pass out of the fiber rather than being internally reflected). Thus, a cable can be bent fairly sharply to place it into expanded enclosure 80. Once inside, however the cable can expand to a larger loop in order to create a service loop lying within the expanded enclosure. Such a service loop has a sufficient diameter to prevent data corruption during operation.

Figure 9:
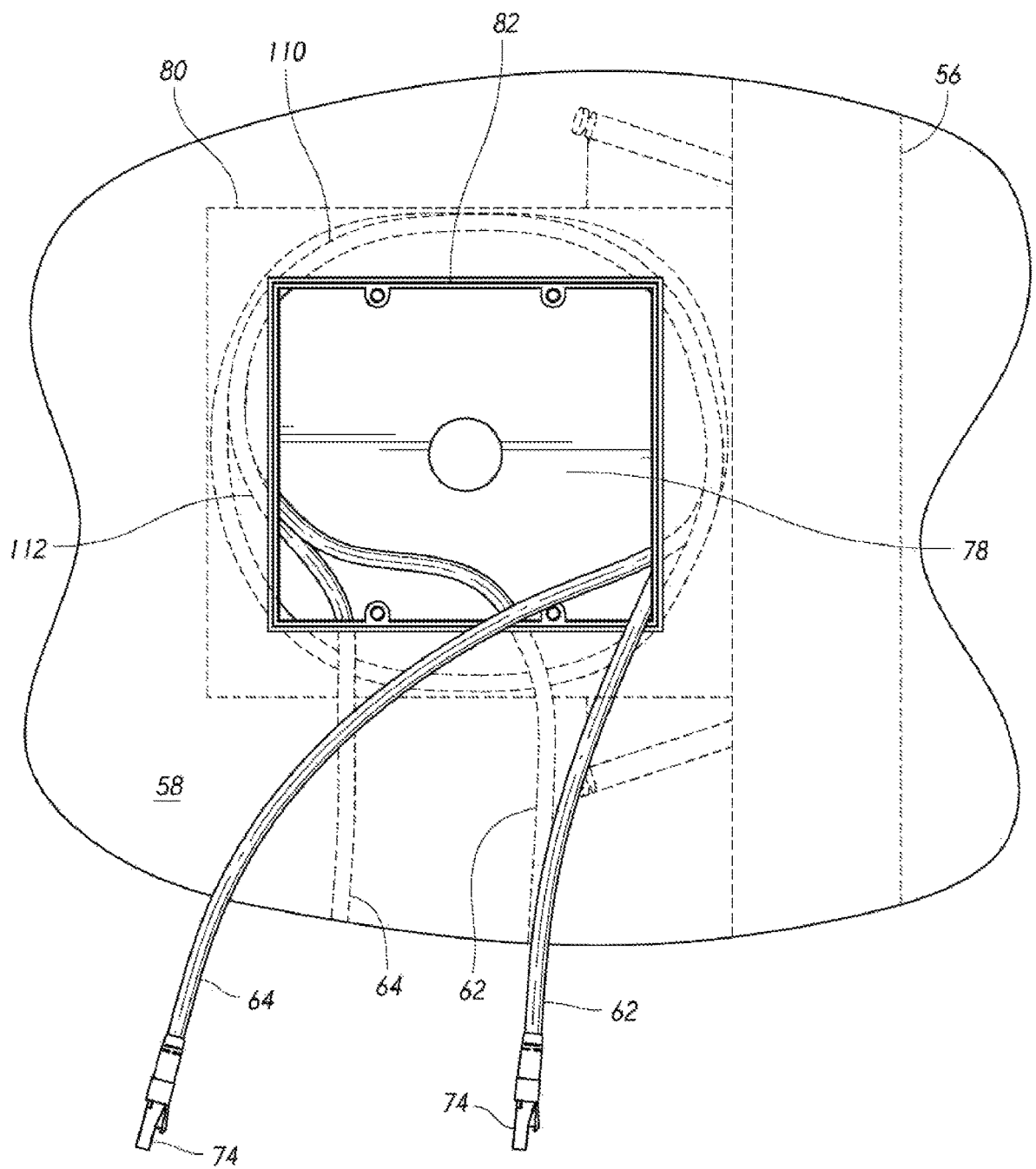
FIG. 9 is an elevation view, showing an embodiment of the present invention in an installed state.

FIG. 9 shows the inventive expanded electrical box installed. The box has been secured to a wall stud 56 using the incorporated nails. A suitable opening has been cut in dry wall 58 so that the front face of coaming 82 is visible through the opening (and the front face lies roughly flush with the surface of the dry wall).

Fiber optic cables 62, 64 run up through the wall (behind the drywall) and into the interior of expanded enclosure 80. The two cables are formed into service loops 110,112 within the expanded enclosure 80. The free end of the fiber optic cables 62, 64 extend out of two-gang opening 78 so that they can connect to a wall-mounted component such as a television. The reader will thereby appreciate that an enlarged service loop is provide for the fiber optic cables without altering the outward appearance of a two-gang box.

Figure 10:
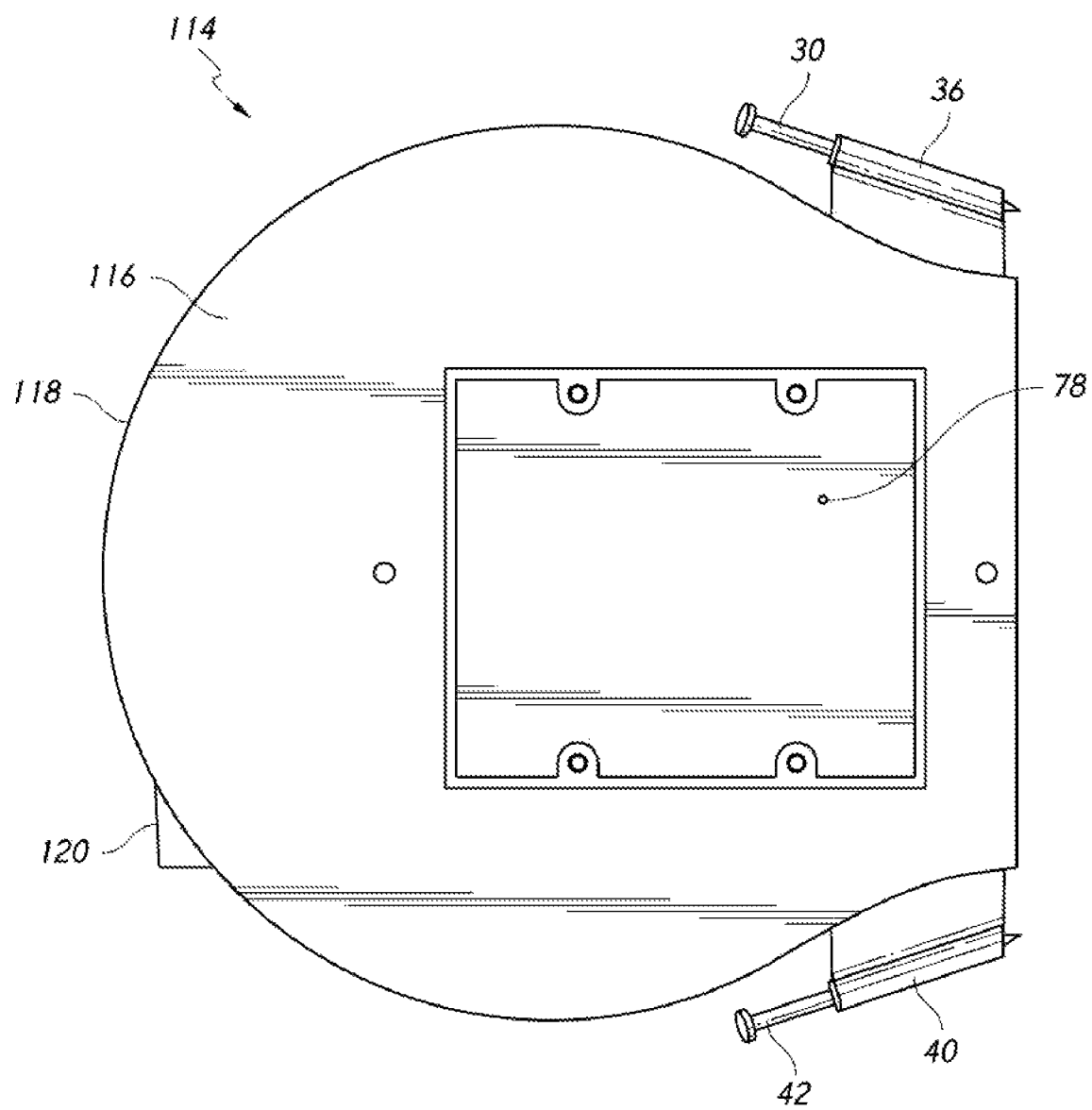
FIG. 10 is an elevation view, showing an alternate embodiment of the present invention.

The simple four-sided construction for the expanded portion in the example of FIG. 9 is one example among many possibilities. Other shapes are possible and will in some instances be more advantageous. FIG. 10 provides an alternate expanded electrical box 114 including an expanded enclosure 116 that incorporates a circular portion. The circular portion allows an even larger diameter service loop to be maintained.

Figure 11:
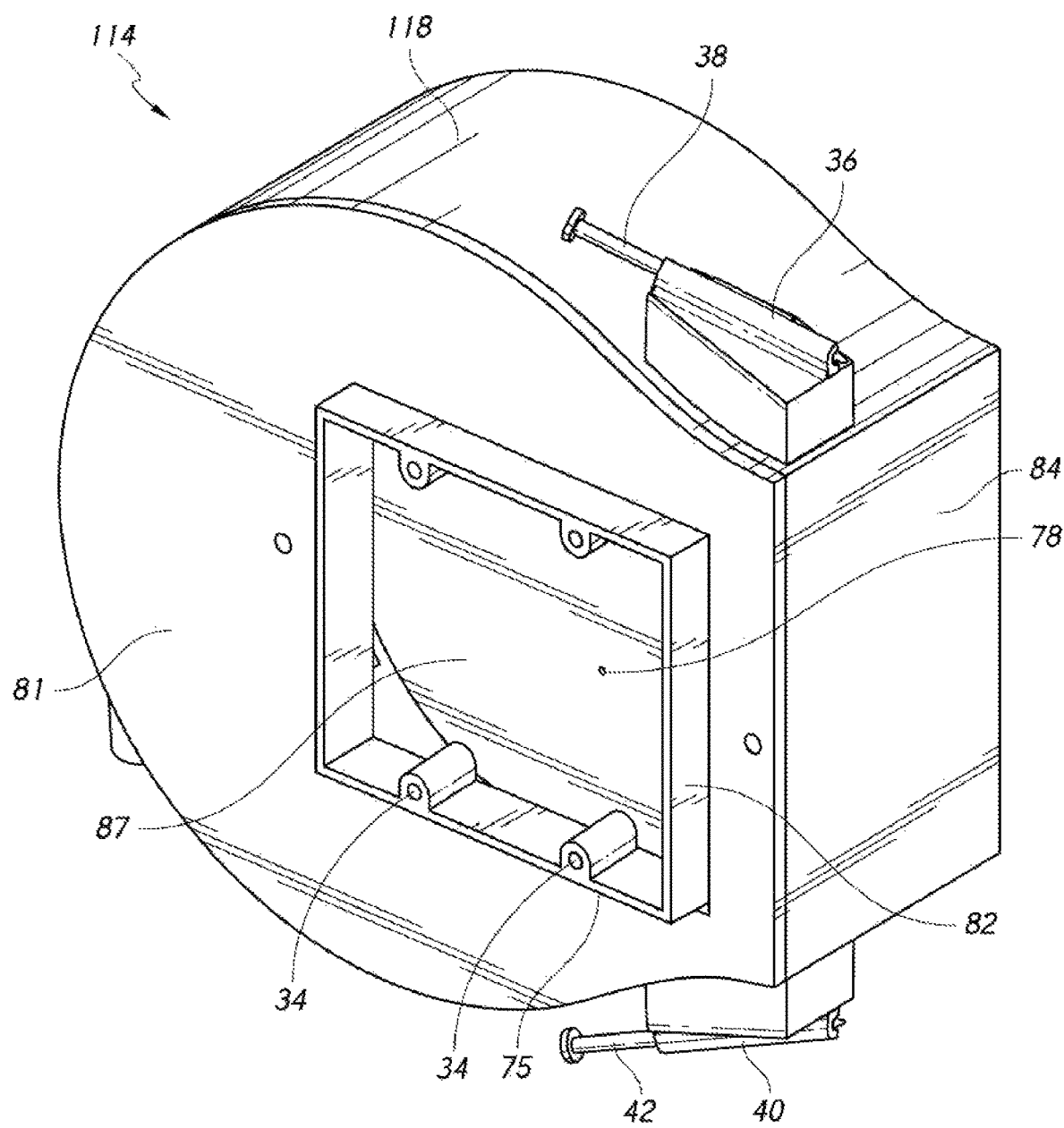
FIG. 11 is a perspective view, showing the embodiment of FIG. 10.

FIG. 11 provides a perspective view of the embodiment of FIG. 10. Two-gang opening is the same configuration as the prior embodiment. Coaming 82 extends forward from forward wall 81. In this configuration forward wall 81 mates against the rearward facing surface of the installed drywall. Coaming 82 extends through an opening cut in the drywall. Mounting holes 34 are provided for the mounting of a switches, outlets, faceplates, etc.

Mounting wall 84 is preferably a planar surface that can be pressed laterally against a vertical stud in order to locate the expanded electrical box. Upper mail mount 36 and lower nail mount 40 are provided as for the prior examples. Nails 38,42 can be driven laterally into a vertical stud in order to secure the inventive device in place. Bolt or screw mounts can be provided as an alternative.

Figure 12:
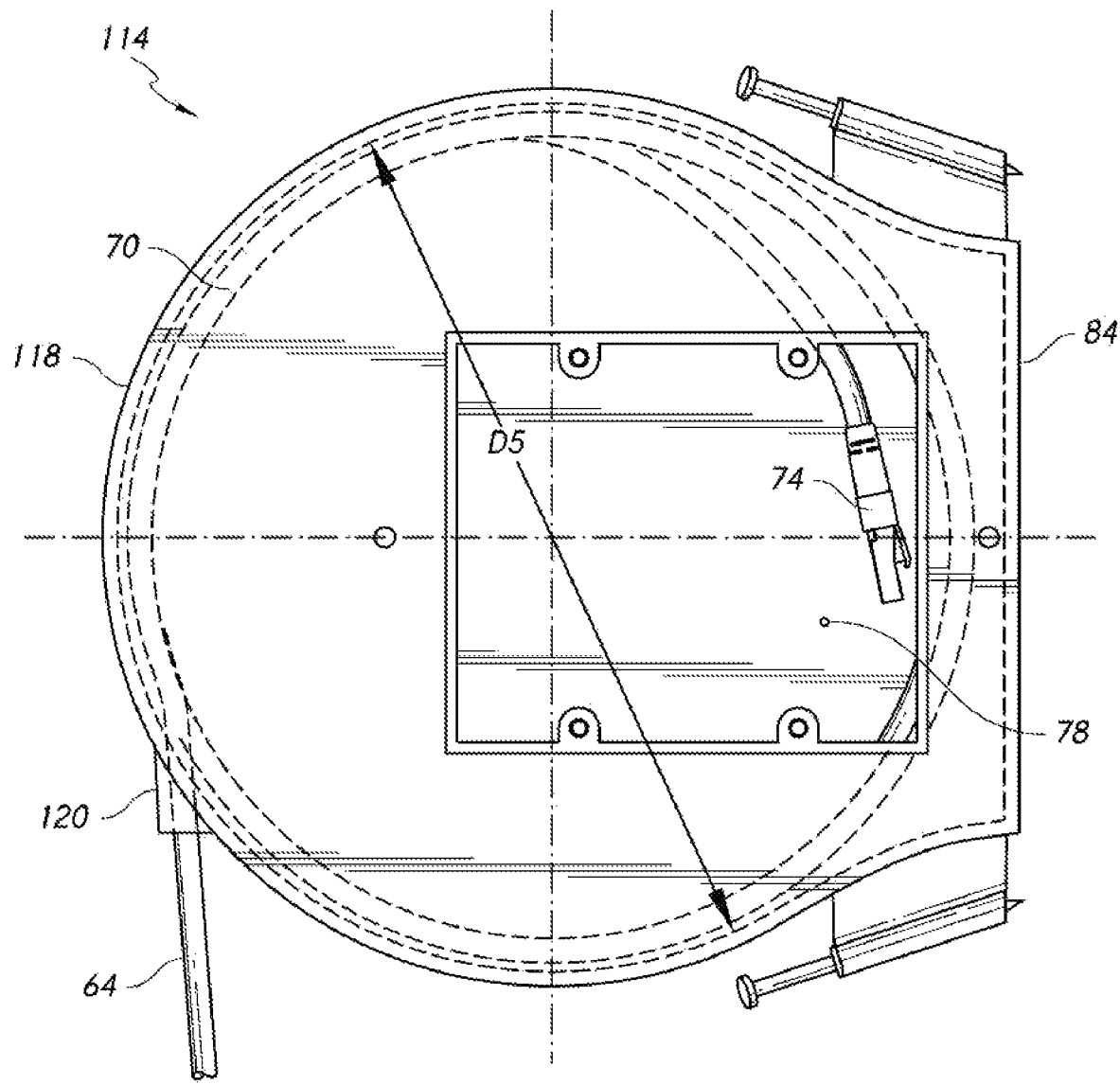
FIG. 12 is an elevation view, showing a loop of cable installed within the embodiment of FIG. 10.

FIG. 12 provides a hidden line view with a single fiber optic cable 64 installed in the inventive expanded electrical box 114. The cable enters the box through cable entrance boss 120. The cable is then formed into a loop within circular perimeter 118. The center of the circular perimeter is preferably offset form the center of two-gang opening 78 as shown. This feature allows a cable and its attached connector 74 to exit through the two-gang opening without requiring a bend that is significantly sharper than the bend within the loop itself.

The inner wall of circular perimeter 118 has a diameter D5. This can be significantly larger than the linear dimensions of the two-gang opening. The reader will recall that two-gang opening dimensions are not standardized. The width appears to vary between about 3.90 and 4.20 inches (99 mm to 107 mm). The height varies between about 3.90 and 4.10 inches (99 mm to 104 mm). A typical minimum service loop diameter for a fiber optical cable is 5.0 inches (127 mm). The configuration of FIG. 12 can easily accommodate this requirement and more. D5 is preferably at least 5.0 inches (127 mm) and even more preferably at least 7.0 inches (178 mm). In the example shown, D5 has a value of 10.0 inches (254 mm).

A significant factor in the present invention is the state of the fiber optic cable when it is in use (when light signals are actually traveling along the cable). It is advantageous to provide a cable entrance for the electrical box that does not cause the fiber optic cable to undergo a significant bend. FIG. 12 shows an exemplary location for cable boss 120—which houses the cable entrance. This cable boss allows the cable to enter the box in a position and orientation that is approximately tangential to circular perimeter 118.

Figure 13:
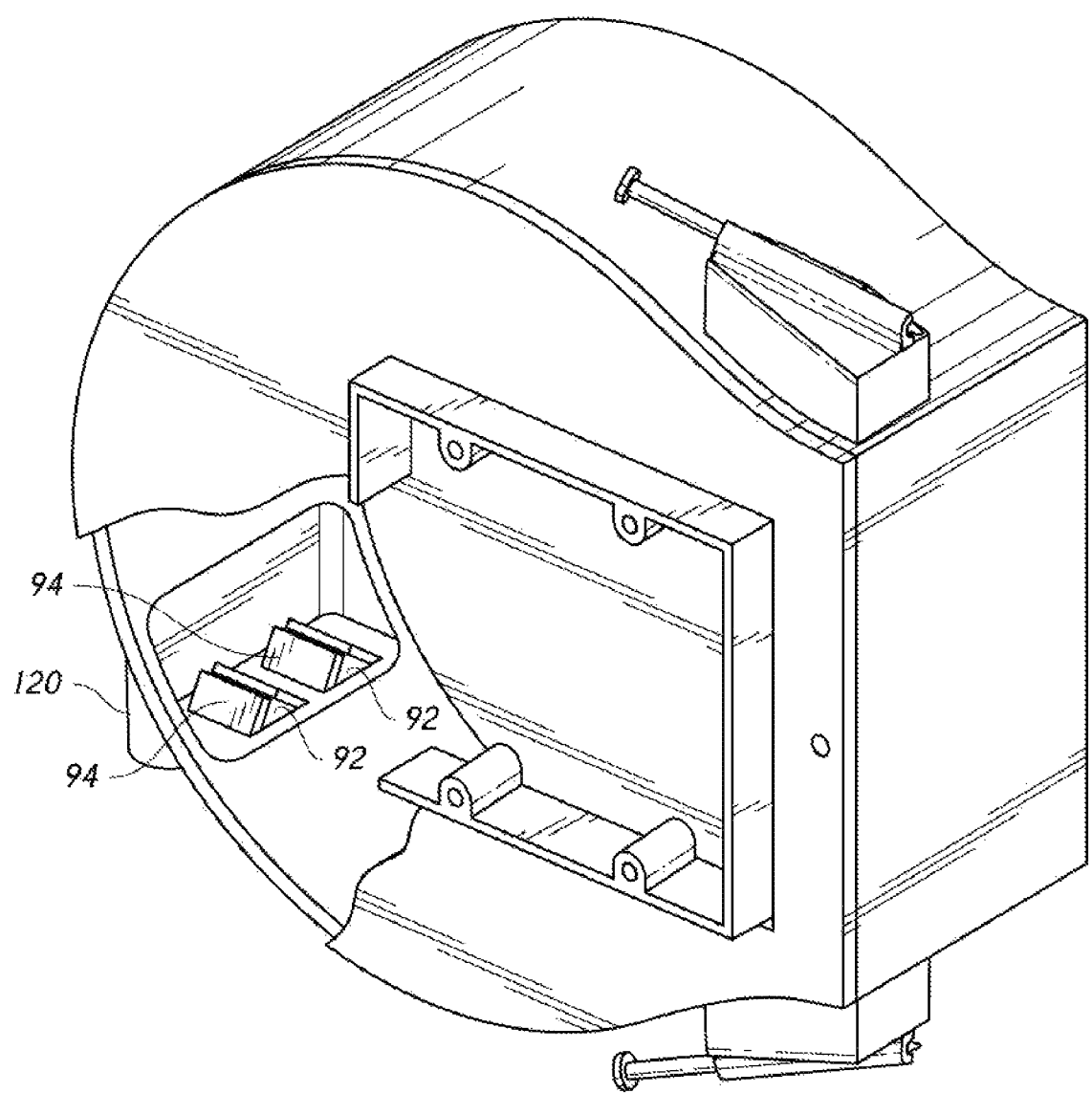
FIG. 13 is a perspective view with a cutaway, showing details of the cable entry area for the embodiment of FIG. 10.

FIG. 13 shows this entrance in more detail. Cable boss 120 is located in an approximately tangential position relative to the circular perimeter. One or more cable openings 92 are provided. Each cable opening is preferably provided with a cable clamp assembly 94. As for the prior art, the cable clamp assembly allows a cable to be easily pushed into the electrical box but resists the motion of the cable in the opposite direction. The invention is not limited to any particular type of cable clamp. The embodiment shown includes two clamps. Other embodiments will include three cable openings, four cable openings, or even more.

It is preferable to mass produce the inventive enclosure using injection molding. Those knowledgeable in that field will recognize that a hollow enclosure such as depicted in FIG. 11 is difficult to mold as a single piece. In fact, the version shown in FIG. 11 is an assembly of at least two pieces. Forward wall 81 and coaming 82 are molded as one piece. The balance of the assembly is molded as a second piece. The two pieces can then be joined together using any suitable approach—including ultrasonic welding, gluing, separate fasteners, or the use of snap features.

The inventive device therefore includes a standard forward-facing opening (such as a two-gang opening) and an expanded enclosure lying behind the opening. The expanded enclosure may include four side walls (including a mounting wall) and a rear wall. The expanded enclosure may assume other shapes—such as a circular perimeter joined to a mounting wall and a rear wall.

This disclosure uses the term "electrical box" because that is standard within the industry. However, the use of the term "electrical" should not be viewed as limited the applications to electrical conductors. The inventive device can be used with electrical conductors, but it can also be used with fiber optic cables. The invention can be used with many other devices as well, including hollow and flexible "air logic" tubing.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the claims that are ultimately drafted rather than the examples given.

Having described our invention, we claim:

1. An expanded electrical box configured to provide an enlarged service loop for a cable, comprising:
   (a) a mounting wall;
   (b) a forward wall;
   (c) a two-gang opening in said forward wall;
   (d) said two-gang opening being bounded by a coaming extending forward from said forward wall;
   (e) wherein a width of said two-gang opening is between 3.75 and 4.50 inches;
   (f) wherein a height of said two-gang opening is between 3.75 and 4.25 inches;
   (g) an expanded enclosure behind said forward wall, wherein said expanded enclosure is larger than said two-gang opening;
   (h) wherein said expanded enclosure has a height of at least 5.25 inches;
   (i) wherein said expanded enclosure has a width of at least 5.25 inches; and
   (j) a cable opening leading into said expanded enclosure.

2. The expanded electrical box as recited in claim 1 wherein said coaming provides a suitable standoff distance for installing dry wall forward of said forward wall.

3. The expanded electrical box as recited in claim 1, further comprising a first nail mount with a first nail and a second nail mount with a second nail.

4. The expanded electrical box as recited in claim 1, wherein said cable opening includes a cable clamp.

5. The expanded electrical box as recited in claim 1, wherein said expanded enclosure includes four side walls and a rear wall.

6. The expanded electrical box as recited in claim 1, wherein said expanded enclosure includes a circular perimeter and a rear wall.

7. The expanded electrical box as recited in claim 6, wherein said coaming provides a suitable standoff distance for installing dry wall forward of said forward wall.

8. The expanded electrical box as recited in claim 6, further comprising a first nail mount with a first nail and a second nail mount with a second nail.

9. The expanded electrical box as recited in claim 6, wherein said cable opening is located in a position that is approximately tangential to said circular perimeter.

10. The expanded electrical box as recited in claim 9 wherein said coaming provides a suitable standoff distance for installing dry wall forward of said forward wall.

11. An expanded electrical box configured to provide an enlarged service loop for a cable, comprising:
    (a) a mounting wall;
    (b) a forward wall;
    (c) a two-gang opening in said forward wall;
    (d) said two-gang opening including a protrusion extending forward from said forward wall;
    (e) wherein a width of said two-gang opening is between 3.75 and 4.50 inches;
    (f) wherein a height of said two-gang opening is between 3.75 and 4.25 inches;
    (g) an expanded enclosure behind said forward wall, wherein said expanded enclosure is larger than said two-gang opening;
    (h) wherein said expanded enclosure has a height of at least 5.25 inches;
    (i) wherein said expanded enclosure has a width of at least 5.25 inches; and
    (j) a cable opening leading into said expanded enclosure.

12. The expanded electrical box as recited in claim 11 wherein said protrusion extending forward from said forward wall provides a suitable standoff distance for installing dry wall forward of said forward wall.

13. The expanded electrical box as recited in claim 11, further comprising a first nail mount with a first nail and a second nail mount with a second nail.

14. The expanded electrical box as recited in claim 11, wherein said cable opening includes a cable clamp.

15. The expanded electrical box as recited in claim 11, wherein said expanded enclosure includes four side walls and a rear wall.

16. The expanded electrical box as recited in claim 11, wherein said expanded enclosure includes a circular perimeter and a rear wall.

17. The expanded electrical box as recited in claim 16, wherein said protrusion extending forward from said forward wall provides a suitable standoff distance for installing dry wall forward of said forward wall.

18. The expanded electrical box as recited in claim 16, further comprising a first nail mount with a first nail and a second nail mount with a second nail.

19. The expanded electrical box as recited in claim 16, wherein said cable opening is located in a position that is approximately tangential to said circular perimeter.

20. The expanded electrical box as recited in claim 19 wherein said protrusion extending forward from said forward wall provides a suitable standoff distance for installing dry wall forward of said forward wall.

* * * * *